No. 852,112.  
PATENTED APR. 30, 1907.
V. G. GILBREATH.  
VEHICLE.  
APPLICATION FILED OCT. 23, 1905. RENEWED MAR. 1, 1907.
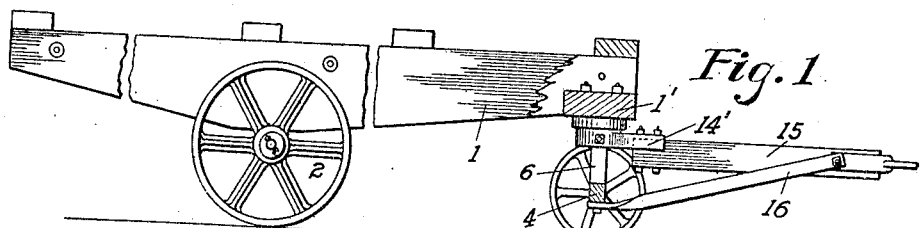
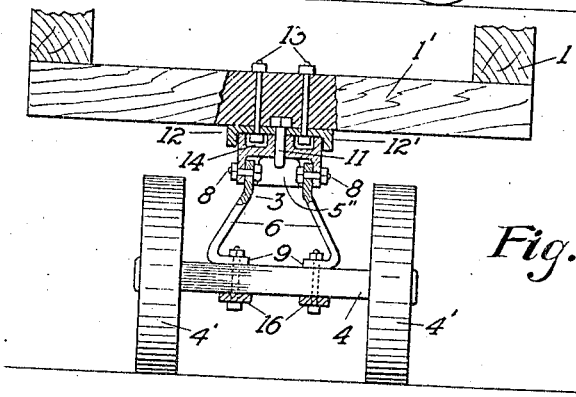
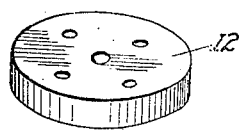
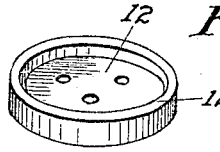
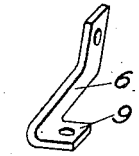
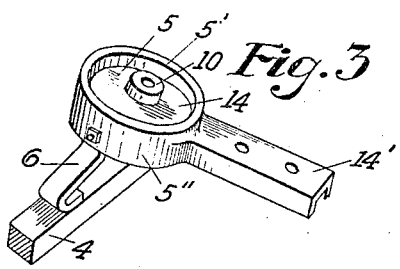
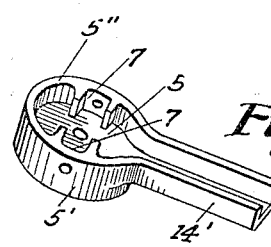
Witnesses  
Inventor  
VICTOR G. GILBREATH.  
By Adams & Brooks  
Attorneys

UNITED STATES PATENT OFFICE.

VICTOR G. GILBREATH, OF SEATTLE, WASHINGTON.

VEHICLE.

No. 852,112.  Specification of Letters Patent.  Patented April 30, 1907.

Application filed October 23, 1905. Renewed March 1, 1907. Serial No. 360,103.

*To all whom it may concern:*

Be it known that I, VICTOR G. GILBREATH, a citizen of the United States of America, and a resident of the city of Seattle, in the county of King and State of Washington, have invented certain new and useful Improvements in Vehicles, of which the following is a specification.

My invention relates to improvements in vehicles, having more particularly reference to that type designed for the conveying of lumber or the like, and the primary object thereof is to improve and simplify such constructions.

With the above and other objects in view, to be referred to in the following description, the invention consists of the construction, arrangement and combinations of parts hereinafter described and succinctly defined in the appended claims.

In the accompanying drawings in which like numerals of reference indicate like parts throughout the several views: Figure 1 is a view in side elevation of a vehicle constructed in accordance with my invention, parts being shown in section. Fig. 2 is an enlarged fragmentary view in front elevation with parts broken away. Fig. 3 is a perspective view of the front axle with the frame which is normally pivoted to the bed of the vehicle, secured thereto. Fig. 4 is an inverted view of the top member or fifth wheel member of said frame. Figs. 5 and 6 are detail perspective views of the other fifth wheel member, the latter view showing said fifth wheel member inverted, and Fig. 7 is a detail perspective view of one of the bars which holds the lower fifth wheel member in fixed relation to the front axle.

The bed 1 of the vehicle, which can be of any approved construction, is provided with a rear axle 2 on which the usual supporting wheels are journaled.

Reference numeral 3 designates a frame which is pivoted to the forward end of the bed 1 and rigidly secured to an axle 4 having the steering wheels 4'. Frame 3 consists of a top member and depending diverging bars 6. The top member is in the form of a disk 5 having edge flanges 5' and 5", the former projecting upwardly from the disk, and the latter downwardly therefrom, and said flange 5" is provided on its inner face at diametrically opposite points with spaced apart lugs forming sockets 7 in which the upper ends of bars 6 are firmly secured, as by bolts 8, as shown.

The lower end portions of bars 6 are bent inwardly to form lugs 9 which are bolted to said axle 4.

The top member of frame 3 constitutes the lower member of the fifth wheels and disk 5 thereof has a boss 10 formed on its upper face, which boss is bored to provide an opening for reception of the pivot bolt 11. The upper member 12 of the fifth wheel is also of disk form and normally bears on the upper edge of flange 5', and at its edge portion is provided with a depending flange 12' which fits over said edge flange 5' and snugly engages the outer face thereof. By this construction the pivot bolt is subjected to but little friction inasmuch as the flanges 5' and 12' hold the respective fifth wheel members in their true concentric relations to the pivot bolt which is the center of oscillation.

The fifth wheel members are of such diameter as to form an extended support to prevent careening of the bed 1, and the upper member is preferably secured to an end cross bar, as 1' of the bed, by bolts 13 whose lower ends, shown as being the headed ends, project into the circular groove or space 14 between the boss 10 and flange 5' of the lower member of the fifth wheel.

The pivot bolt has its head impinged between cross bar 1', which is preferably cut out to form a seat therefor, as shown, and the member 12 of the fifth wheel and therefore cannot be accidentally displaced.

This construction is extremely simple and durable and is particularly desirable in this type of vehicles inasmuch as the front axle, having the frame 3 secured thereto, which is conveniently termed the fore truck of the vehicles can be readily coupled and uncoupled, the pivot bolt merely having a seating in the opening of boss 10 and therefore one fore truck can be employed in conjunction with one bed 1 for conveying a load of lumber to its destination, then uncoupled and coupled to another loaded bed 1, so that my improved fore truck can, although this is not absolutely essential, be employed continuously for conveying other loaded beds while those already conveyed are being unloaded.

Reference numeral 14' designates a casting formed integral with the lower member of the fifth wheel and having its under face formed with a groove in which the tongue 15 is received and bolted. Tongue 15 aside from being secured in casting 14' is also braced by suitable brace rods 16, which are bolted thereto adjacent its outer end and to the front axle.

While I have herein shown and described a preferred embodiment of my invention, I reserve the right to make various alterations and changes in details of construction as defined in the appended claims.

Having thus described my invention, what I claim as new, and desire to secure by Letters Patent of the United States of America, is:—

1. In a vehicle of the type set forth, in combination with the bed and the rear axle, a front axle, and a frame pivoted to the bed, said frame comprising a top member formed with sockets, and bars secured at one end in said sockets and having their other ends fixed to said front axle.

2. In a vehicle of the type set forth, in combination with the bed, a fifth wheel member having an edge flange, bolts projecting through said fifth wheel member for securing the same to the bed, a lower fifth wheel member having a boss formed with an opening and a flange spaced therefrom, said last named fifth wheel member having a depending flange formed with opposite sockets, bars secured in said sockets and to the axle, and a pivot bolt projecting through the upper fifth wheel member and into the boss of said lower fifth wheel member.

3. In a vehicle of the type set forth, in combination with the bed and the rear axle, a front axle, a fifth wheel having one member secured to the bed, the other member being formed with oppositely disposed sockets, and bars having their upper end portions secured in said sockets and having their lower end portions secured to said front axle.

Signed at Seattle, Washington this 12th day of October 1905

VICTOR G. GILBREATH.

Witnesses:
   Stephen A. Brooks,
   Arlita Adams.